United States Patent
Yamagiwa

(10) Patent No.: US 7,004,217 B1
(45) Date of Patent: Feb. 28, 2006

(54) TIRE CONTAINING SEALING AGENT

(75) Inventor: Toshio Yamagiwa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 361 days.

(21) Appl. No.: 09/926,485

(22) PCT Filed: Apr. 18, 2000

(86) PCT No.: PCT/JP00/02521

§ 371 (c)(1),
(2), (4) Date: Jan. 25, 2002

(87) PCT Pub. No.: WO00/68028

PCT Pub. Date: Nov. 16, 2000

(30) Foreign Application Priority Data

May 10, 1999 (JP) .................................. 11/128863

(51) Int. Cl.
*B60C 5/00* (2006.01)
*B60C 5/02* (2006.01)
*B60C 5/14* (2006.01)

(52) U.S. Cl. ...................... 152/502; 152/503; 152/504; 152/510

(58) Field of Classification Search ................ 152/502, 152/503, 504, 505, 507, 510
See application file for complete search history.

(56) References Cited

U.S. PATENT DOCUMENTS

| 3,042,098 | A | * | 7/1962 | Reinowski et al. | ......... 152/503 |
| 3,563,294 | A | * | 2/1971 | Chien | .......... 152/505 |
| 3,565,151 | A | | 2/1971 | Courtney | |
| 3,903,947 | A | | 9/1975 | Emerson | |
| 4,286,643 | A | * | 9/1981 | Chemizard et al. | ......... 152/505 |
| 4,453,992 | A | | 6/1984 | Kuan et al. | |
| 4,502,520 | A | * | 3/1985 | Sandstrom | .................. 152/510 |
| 4,539,344 | A | * | 9/1985 | Van Ornum et al. | ........ 523/166 |

FOREIGN PATENT DOCUMENTS

| JP | 7-266454 | 10/1995 |
| JP | 8-323875 | 12/1996 |
| JP | 9-309974 | 12/1997 |

* cited by examiner

*Primary Examiner*—Jeff H. Aftergut
*Assistant Examiner*—Justin Fischer
(74) *Attorney, Agent, or Firm*—Arent Fox PLLC

(57) ABSTRACT

In a sealant-containing tire, an outer liner is fastened to an inner surface of a tread of a tire body, and a sealant chamber that is filled with sealant is defined between the outer liner and the inner liner, with an air chamber filled with air also being defined within the inner liner. By making the inner liner of flexible rubber of a 300% modulus of 60 kgf/cm$^2$ or less, not only is a puncture in the inner liner caused by a nail made smaller, but the puncture is rapidly made smaller after withdrawal of the nail so that the flowing out of air from the air chamber is delayed. The flexible inner liner can easily be deformed by the air pressure within the air chamber and the sealant within the sealant chamber is therefore rapidly pushed into a puncture of the tread by the air pressure, thereby effectively repairing the puncture.

1 Claim, 3 Drawing Sheets

TIRE CONTAINING SEALING AGENT

FIELD OF THE INVENTION

The present invention relates to a sealant-containing tire with an annular sealant chamber filled with sealant formed at an inner surface of a tread of a tire body, and with the sealant chamber and an air chamber being partitioned by a partition.

BACKGROUND ART

Sealant-containing tires such as disclosed in Japanese Patent Application Laid-open No. 8-323875, where a sealant chamber at least partially defined by a liner is formed at an inner surface of a tread of a tire body so that punctures in the tread caused by nails etc. are automatically sealed by sealant contained within the sealant chamber so as to delay the leaking of air from the puncture are well known.

FIG. 3 shows the situation for a related sealant-containing tire when a puncture caused by a nail etc. penetrates a tread 4, sealant chamber 7 and liner 3 so as to reach an air chamber 8. Because the rubber of the tread 4 is hard, after the nail etc. is removed, little contraction (refer to the arrows) of the puncture $4_1$ due to the elasticity of the rubber is anticipated. Contraction of a puncture $3_1$ (refer to the arrows) after removal of the nail etc. is also slight because the rubber of the liner 3 in related sealant-containing tires is relatively hard. Air within the air chamber 8 therefore flows to the outside in a forceful manner through the puncture $3_1$ in the liner 3 and the puncture $4_1$ in the tread 4 and repair of the puncture $4_1$ in the tread 4 by the sealant 6 with which the sealant chamber 7 is filled can therefore not be carried out in an effective manner.

DISCLOSURE OF THE INVENTION

In order to resolve the aforementioned situation, it is the object of the present invention to increase the effectiveness of repairing a puncture with sealant in a sealant-containing tire in order to delay the flowing out of air from an air chamber.

In order to achieve the aforementioned object, there is proposed a sealant-containing tire with an annular sealant chamber filled with sealant formed at an inner surface of a tread of a tire body, and with the sealant chamber and an air chamber being partitioned by a partition. The partition is formed of a material of a 300% modulus of 60 kgf/cm$^2$ or less.

According to this configuration, by making the partition defining the air chamber and the sealant chamber of flexible material of a 300% modulus of 60 kgf/cm$^2$ or less, not only are punctures caused by nails etc. made smaller, but the punctures are rapidly made smaller after withdrawal of a nail etc. so that the flowing out of air from the air chamber is delayed. The flexible partition can easily be deformed by the air pressure within the air chamber and the sealant within the sealant chamber is therefore rapidly pushed into a puncture of the tread so that a puncture can effectively be repaired.

BRIEF DESCRIPTION OF THE DRAWINGS

FIG. 1 is a lateral cross-section of a wheel mounted with a sealant-containing tire and FIGS. 2A and 2B are views illustrating the operation when the sealant-containing tire has a puncture.

BEST MODE FOR CARRYING OUT THE INVENTION

The following is a description of practical examples of the present invention based on embodiments of the present invention shown in the appended drawings.

Figure 1:
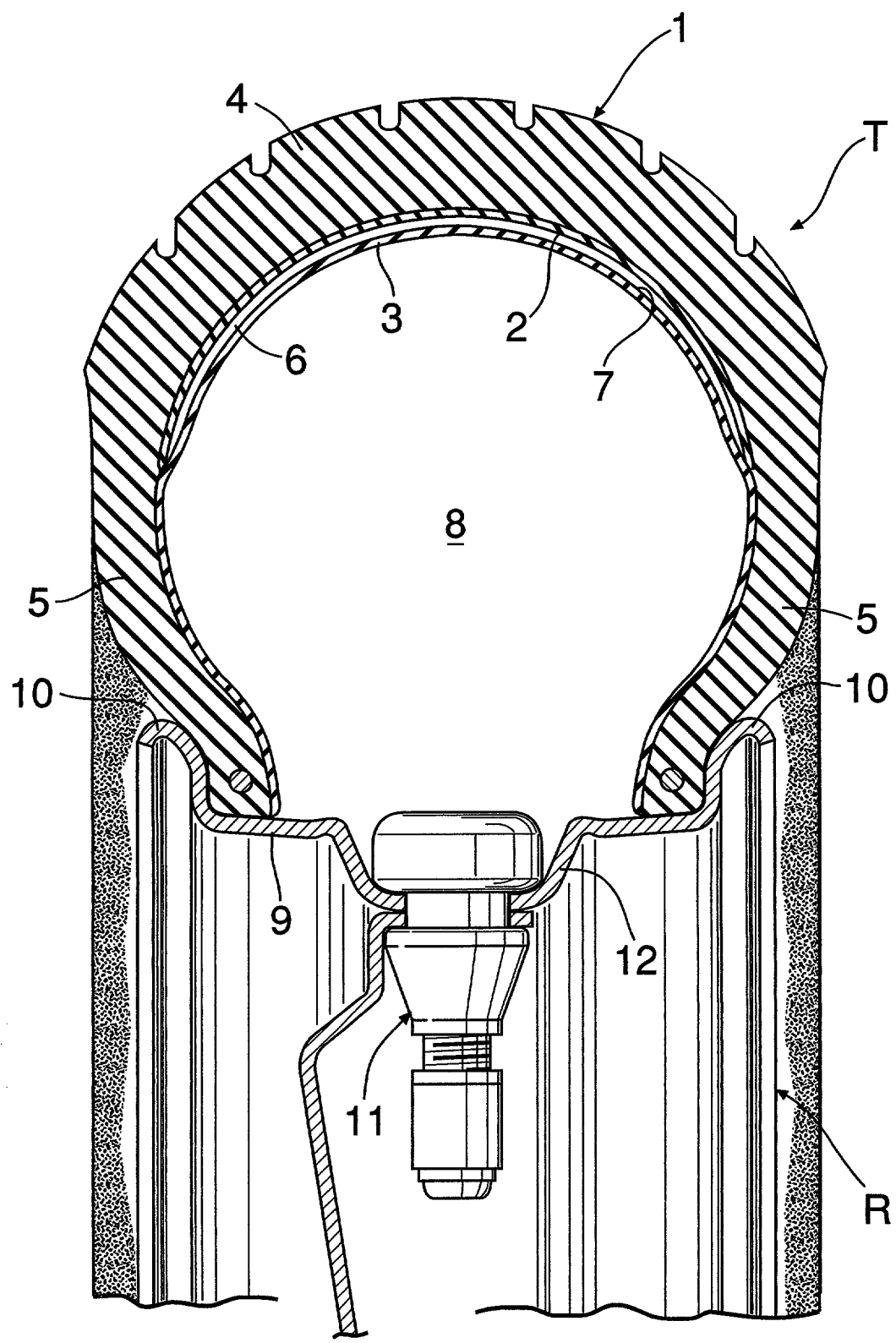
FIG. 1, FIGS. 2A and 2B show an embodiment of the present invention, where
Figure 2A:
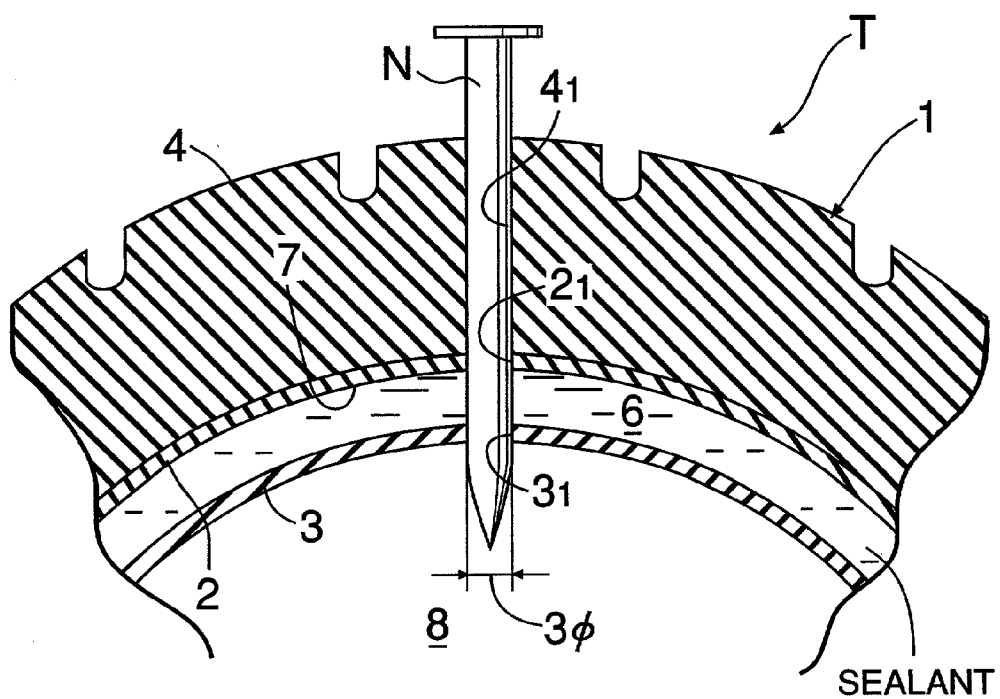
Figure 2B:
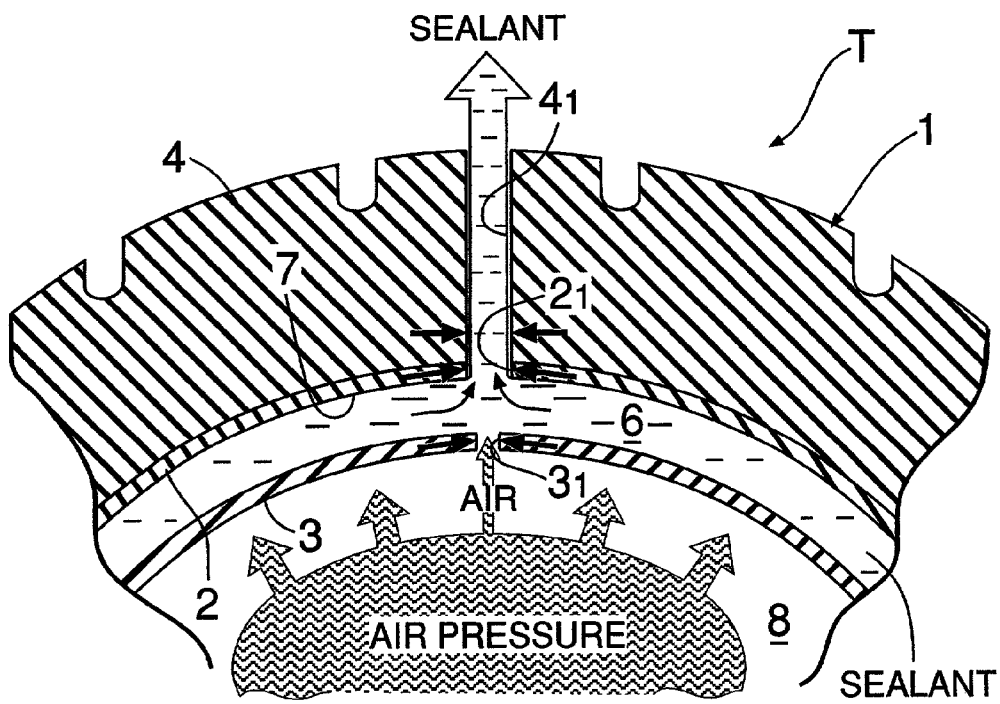
Figure 3:
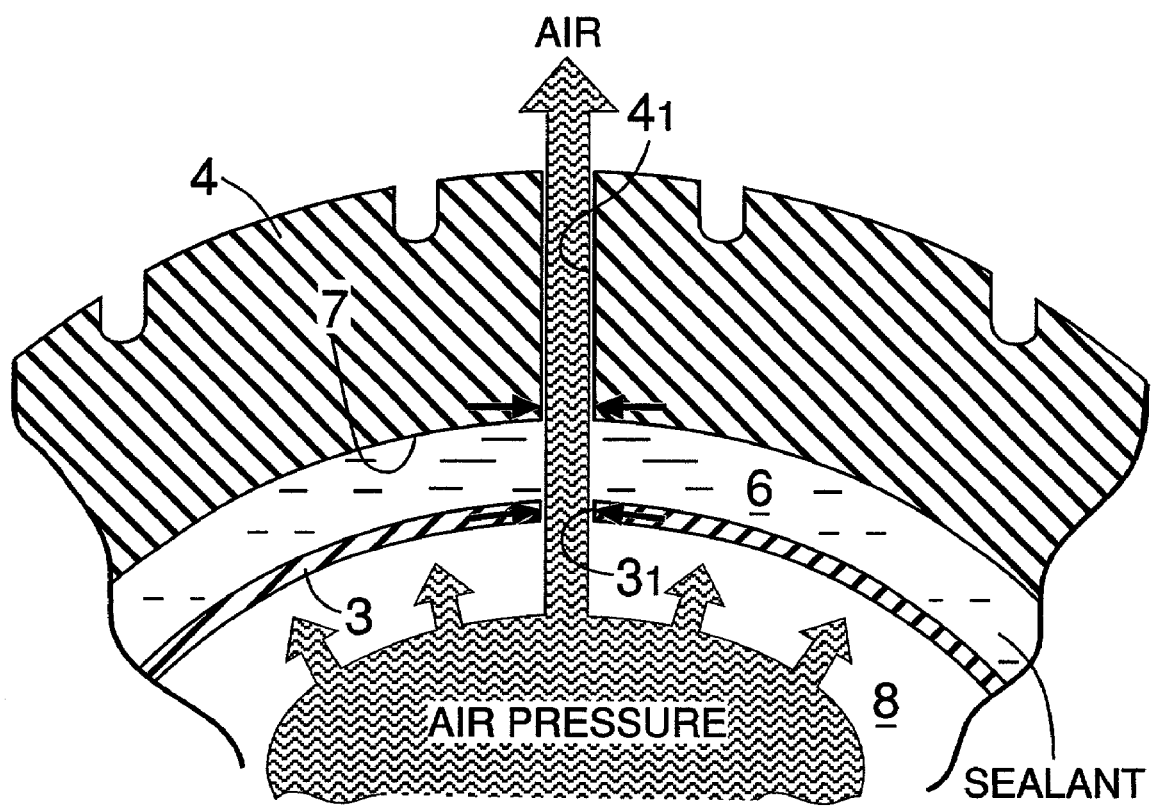
FIG. 3 shows a prior art punctured sealant-containing tire.

FIG. 1, FIG. 2A and FIG. 2B show an embodiment of the present invention.

As shown in FIG. 1, a tubeless tire T comprising a tire body 1, an outer liner 2 fastened by vulcanization to the inner part of the tire body 1, and an inner liner 3 are mounted on a motorcycle wheel rim R. The outer liner 2 is fastened by vulcanization to the inner surface of a tread 4 of the tire body 1 and the left and right ends of the inner liner 3 excluding the central part are fastened by vulcanization to the inner surfaces of left and right side walls 5, 5 of the tire body 1. A sealant chamber 7 substantially arc-shaped in cross-section that is filled with sealant 6 is defined between the central part of the inner liner 3 and the outer liner 2 and an air chamber 8 substantially circular in cross-section is defined within the inner liner 3.

The inner liner 3 partitioning the sealant chamber 7 and the air chamber 8 forms the partition of the present invention and is therefore composed of butyl rubber (IIR) of a 300% modulus of 60 kgf/cm$^2$ or less. The 300% modulus indicates the magnitude of tensile stress when a material is extended to 300%, with materials having a smaller 300% modulus being more flexible.

The rim R is equipped with an annular rim body 9 extending in a circumferential direction of the tire T, and a pair of flanges 10, 10, extending radially outwards in a widthwise direction from both ends of the rim body 9, for supporting the inner periphery of the tire body 1. An air valve 11 for filling the air chamber 8 with air is supported so as to pass through an air valve attachment section 12 formed at one location in the circumferential direction of the rim body 9.

After the nail N penetrating the tread 4 of the tire body 1, outer liner 2 and inner liner 3 as shown in FIG. 2A is withdrawn, punctures $4_1$, $2_1$, and $3_1$ are formed in the tread 4, the outer liner 2 and the inner liner 3, respectively, as shown in FIG. 2B.

The puncture $4_1$ only contracts slightly after the nail N is pulled out because the tread 4 of the tire body 1 is formed of resilient rubber. The rubber of the outer liner 2 is flexible compared to the rubber of the tread 4, but the outer liner 2 is thin and is fastened to the inner surface of the tread 4 so as to be integrally formed with the tread 4. The puncture $2_1$ in the outer liner 2 therefore also only contracts slightly after removal of the nail N. On the other hand, because the inner liner 3 is made of flexible rubber of a 300% modulus of 60 kgf/cm$^2$ or less, the puncture $3_1$ rapidly contracts after the nail N is withdrawn so as to be of a diameter substantially smaller than the diameter of the nail N.

When the puncture $3_1$ in the inner liner 3 contracts, it becomes difficult for the air within the air chamber 8 to pass through the puncture $3_1$, and the amount of air that flows to the outside of the tire body 1 through the punctures $2_1$ and $4_1$ in the outer liner 2 and the tread 4 is reduced. Further, because the inner liner 3 is flexible, the inner liner 3 can be easily deformed by the air pressure within the air chamber 8 so that the volume of the sealant chamber 7 is therefore reduced. Sealant 6 pushed out from the sealant chamber 7 therefore fills the punctures $2_1$ and $4_1$ in the outer liner 2 and the tread 4 and the punctures $2_1$ and $4_1$ are therefore effectively repaired.

TABLE 1

|  | Puncture Diameter (Pin Diameter; 3 mm) | Puncture Diameter (Pin Diameter; 5 mm) |
|---|---|---|
| Comparative Example | 2.0 mm | 2.0 to 3.0 mm |
| Embodiment | 1.5 mm | 1.5 to 2.0 mm |

Table 1 shows measurements of the diameter of punctures formed in the inner liner 3 when a tire (comparative example) fitted with an inner liner 3 of a 300% modulus exceeding 60 kgf/cm² and a tire (embodiment) fitted with an inner liner 3 of a 300% modulus of 60 kgf/cm² or less are pierced by two types of pins for nails of diameters of 3 mm and 5 mm. It can therefore be understood that the diameter of the puncture is reduced with the embodiment fitted with an inner liner 3 of flexible rubber of a 300% modulus of 60 kgf/cm² or less, compared with the comparative example.

TABLE 2

|  | Comparative Example 1 | Comparative Example 2 | Example 1 | Example 2 |
|---|---|---|---|---|
| 300% Modulus (kgf/cm²) | 100 | 80 | 60 | 40 |
| Extension at Time of Rupture (%) | 300 | 450 | 550 | 650 |
| Tensile Stress at time of Rupture (kgf/cm²) | 100 | 150 | 120 | 100 |
| Pin Diameter; 2 mm | ◯ | ◯ | ◯ | ◯ |
| Pin Diameter; 3 mm | Δ | ◯ | ◯ | ◯ |
| Pin Diameter; 4 mm | X | Δ | ◯ | ◯ |
| Pin Diameter; 5 mm | X | X | ◯ | ◯ |
| Pin Diameter; 6 mm | X | X | Δ | ◯ |
| Pin Diameter, 7 mm | X | X | X | Δ |

◯; Air leakage stopped rapidly.
Δ; Air leakage stopped in stages.
X; Air leakage not stopped.

Table 2 shows investigation of the extent to which air leaks from the air chamber 8 when punctures are made in tires with pins acting as nails of various diameters. In comparative example 1, a liner (of a 300% modulus of 100 kgf/cm²) for preventing air from passing is fastened to the inner surface of a tire body of a typical tubeless tire that does not contain sealant. In comparative example 2, an inner liner 3 of a 300% modulus of 80 kgf/cm² is fastened to a tire of the structure shown in FIG. 1. In embodiments 1 and 2, inner liners 3 of 300% moduli of 60 kgf/cm² and 40 kgf/cm², respectively, are fastened to the tire of the structure of FIG. 1.

As becomes clear from Table 2, the effectiveness of preventing the leaking of air is improved as the 300% modulus is reduced, i.e. as the rubber of the inner liner 3 becomes more flexible, so that leaking of air can be effectively prevented even if the diameter of the pin causing the puncture is increased. This effectiveness is particularly striking for examples 1 and 2 where the 300% modulus is 60 kgf/cm² or less.

The embodiment of the present invention has been described above but various design modifications are possible without deviating from the spirit of the present invention.

For example, with the tire T of this embodiment, the outer liner 2 is fastened to the inner surface of the tread 4 of the tire body 1, but the present invention can also be applied to a tire T that does not have an outer liner 2. Further, the material for the inner liner 3 is by no means limited to butyl rubber (IIR).

INDUSTRIAL APPLICABILITY

As is apparent from the above, the sealant-containing tire according to the present invention is applicable to a two-wheeled motor vehicle and further to other types of vehicles, e.g., a bus, a truck or an automobile.

The invention claimed is:

1. A sealant-containing tire comprising a tire body, an outer liner fastened to an inner surface of a tread of the tire body, and an inner liner defining an air chamber inside the inner liner, the outer liner and the inner liner together defining an annular sealant chamber therebetween which is filled with sealant, the sealant chamber and the air chamber being partitioned by said inner liner,
   wherein the inner liner is formed of a material of a 300% modulus of 60 kgf/cm² or less.

* * * * *